United States Patent
Girard

(10) Patent No.: US 6,976,172 B2
(45) Date of Patent: Dec. 13, 2005

(54) SYSTEM AND METHOD FOR PROTECTED MESSAGING

(75) Inventor: Luke E. Girard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 09/752,882

(22) Filed: Dec. 28, 2000

(65) Prior Publication Data

US 2004/0221168 A1 Nov. 4, 2004

(51) Int. Cl.[7] ............................................. G06F 12/14
(52) U.S. Cl. ..................................... 713/193; 713/200
(58) Field of Search ............................... 713/1, 2, 200, 713/202, 156, 187, 188, 189, 190, 193

(56) References Cited

U.S. PATENT DOCUMENTS

| | | | | |
|---|---|---|---|---|
| 5,022,077 | A | * 6/1991 | Bealkowski et al. | 711/163 |
| 5,835,594 | A | * 11/1998 | Albrecht et al. | 713/187 |
| 5,844,986 | A | * 12/1998 | Davis | 713/187 |
| 6,138,239 | A | * 10/2000 | Veil | 713/200 |
| 6,327,660 | B1 | * 12/2001 | Patel | 713/193 |
| 6,546,489 | B1 | * 4/2003 | Frank, Jr. et al. | 713/187 |

OTHER PUBLICATIONS

Intel[R] Protected Access Achitecture, Application Interface Specification, Revision 0.9.5, Aug. 2000.
Trusted Computing Platform Alliance, Copyright 2000 Compaq Computer Corporation, HewlettPackard Company, IBM Corporation, Intel Corporation, Microsoft Corporation.
"Wired for Management Baseline", Version 2.0 Release, Specification to help reduce Total Cost of Ownership for business conputers, Dec. 18, 1998, Intel Corporation.

* cited by examiner

*Primary Examiner*—Khanh Dang
(74) *Attorney, Agent, or Firm*—Blakely, Sokoloff, Taylor & Zafman LLP

(57) ABSTRACT

A system and method for protected messaging. The method comprises providing a first interface to a protected storage medium to enable a pre-operating system software program access to the protected storage medium. Similarly the method also comprises providing a second interface to the protected storage medium to enable an operating system present software program access to the protected storage medium. In one embodiment, the method comprises enabling a pre-operating system software program to pass information to and receive information from an operating system present software program or another pre-operating system software program by accessing a protected storage medium via the first interface. In another embodiment, the method comprises enabling an operating system present software program to pass information to and receive information from a pre-operating system software program or another operating system present software program by accessing the protected storage medium via the second interface. The method may be implemented on any personal computing device.

24 Claims, 2 Drawing Sheets

SYSTEM AND METHOD FOR PROTECTED MESSAGING

BACKGROUND

Field of the Invention

The invention relates to the field of computers and passing messages between a pre-operating system program and an operating system present program. More specifically, information may be passed among pre-operating system programs and operating system present programs on a computing device via a protected storage.

BACKGROUND OF THE INVENTION

As computers and computing devices are now ubiquitous in our society, computer security issues have become important. Ways of deterring theft of computers and computing devices are evolving to meet the challenges posed by the portable nature of laptop computers, cellular telephones, personal digital assistants, and other computing devices. Various methods of user authentication may be used to provide security and deter theft. These methods include passwords, retinal scan, fingerprint scan, and voice scan.

In some computers, upon powering up, the computer's basic input output system (BIOS) may require authentication such as a password before allowing an operating system to boot. In other computing devices, a password or other authentication must be provided to allow for completion of booting of an operating system, connecting to a network, accessing a database, or starting application programs such as, for example, an electronic mail program. Some programs provide for secure documents such that a document may not be viewed, or edited without entering a password or otherwise authenticating the user's right to access the document.

Although all these security measures exist in various forms, a user may become burdened by and annoyed at having to remember multiple passwords, at having to enter multiple password, and at having to regularly authenticate the user's rights to use the particular computing device, software program, etc.

DETAILED DESCRIPTION OF THE INVENTION

Figure 1:
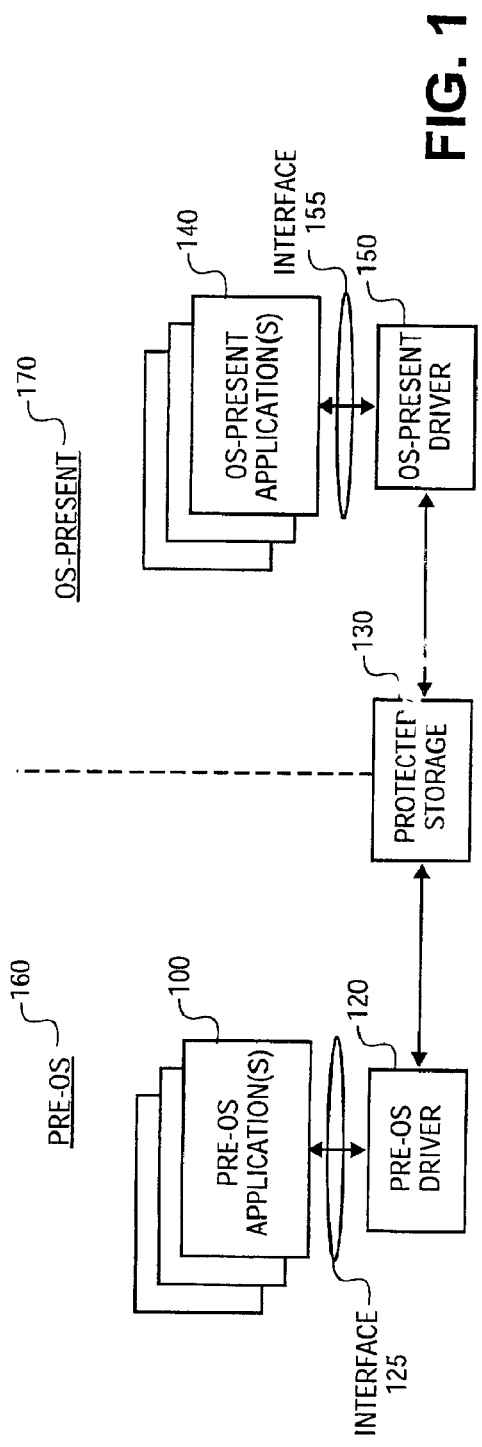
FIG. 1 illustrates an embodiment of a system architecture in which the system and method for protected messaging are practiced.

FIG. 1 illustrates an embodiment of a system architecture in which the system and method for protected messaging are practiced. This invention describes how a new platform primitive, protected storage 130, may be used to send messages between the pre-operating system (Pre-OS) operating space 160 and the operating system present (OS-Present) operating space 170. This protected message passing enables, among other things, the ability to have single, or at least simplified, log on capability. That is, information about the user who logs on to a computing device during booting up and how they logged in may be placed in protected storage so that other Pre-OS programs and OS-Present user applications may access it. Similarly, OS-Present applications may send messages to other OS-Present applications and Pre-OS applications via the protected storage. One example of an OS-Present application leaving a message for a Pre-OS application via the protected storage may be to reconfigure hardware or software components. In this example, a high-level OS-Present application may be used to obtain configuration information that may be used by one or more Pre-OS applications to reconfigure the system. In a related embodiment, an OS Present application may store an executable routine in the protected storage which is run by a Pre-OS application upon rebooting/restarting. In addition, OS-Present applications may use the protected storage to transfer configuration data, security policies, authentication data and other information among themselves, and may also share this information with or receive this information from Pre-OS applications via the protected storage. Pre-OS applications 100 and OS-Present applications 140 use interfaces 125 and 155 to access protected storage medium 130 to accomplish this method and system. These interfaces are provided by Pre-OS driver 120 and OS-Present driver 150. In this way, a general bi-directional messaging feature is provided.

As used herein, a Pre-OS application program may include a basic input output system (BIOS) program as well as other applications that may execute during boot up before the operating system is loaded and may include applications stored on optional read-only memory (ROM) devices associated with various peripherals attached to or part of the personal computing device. An OS-Present application program may be any application program that runs while the operating system is present.

In one embodiment, the protected storage medium may be the protected storage hardware or hardware layer of the Intel® Protected Access Architecture (EPAA) described in Application Interface Specification, Rev. 0.9.5 available from Intel Corporation of Santa Clara, California. (the "IPAA Specification"). In this embodiment, interface 125 may be the interface layer described in the IPAA Specification, and Pre-OS driver 120 may be the support layer or service provider described in the IPAA Specification.

Figure 2:
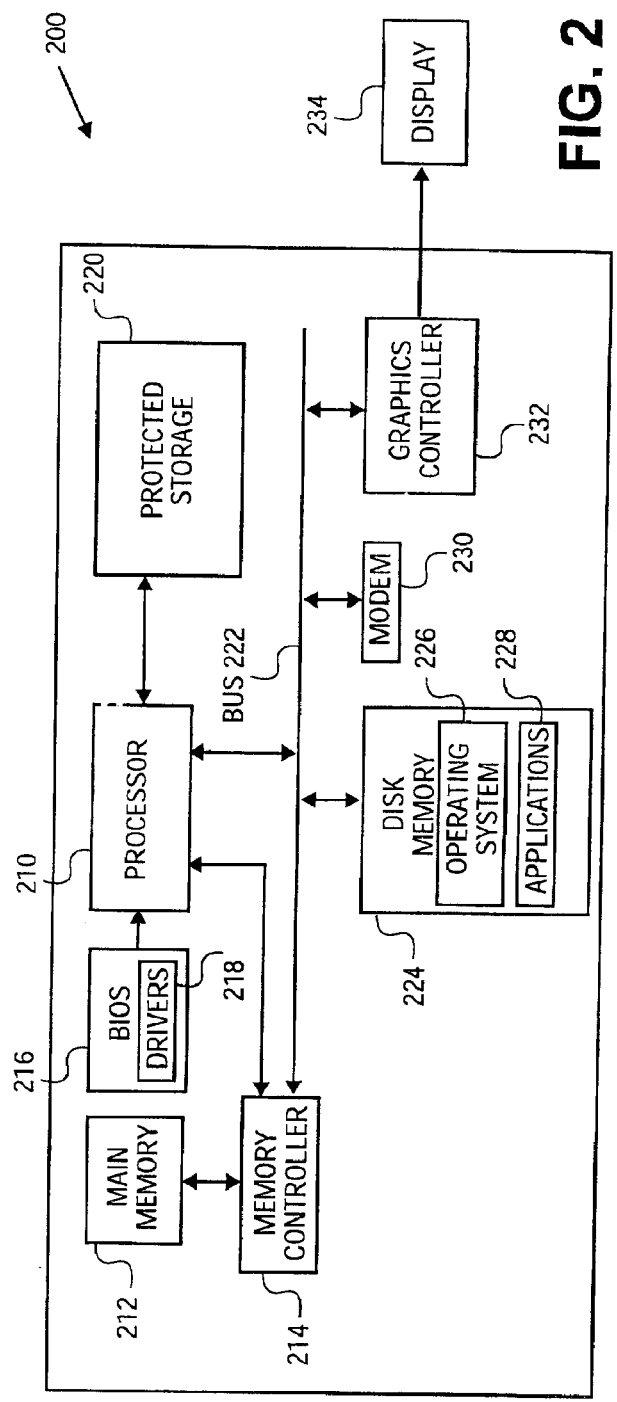
FIG. 2 illustrates an embodiment of a computing device in which the system and method for protected messaging are practiced.

FIG. 2 illustrates an embodiment of a computing device in which the system and method for protected messaging are practiced. Computing device 200 may be a personal computer, a portable computer, a server, a cellular telephone, a personal digital assistant, a computer tablet, or other computing device. The computing device 200 illustrated in FIG. 2 is of a personal computer embodiment in which processor 210 may execute instructions using main memory 212 which is accessed via memory controller 214. Main memory may be any well known random access memory (RAM) or other volatile memory device. The instructions may be obtained from BIOS chip 216 and software stored on disk memory 224 such as operating system 226 and application programs 228. In one embodiment, protected storage 220 may be exclusively coupled to processor 210. In another embodiment, the protected storage may be coupled to the processor via bus 222. In this embodiment, other components may be able to access the protected storage. Instructions may also be provided via drivers 218 which may be included on the BIOS chip 216. Drivers 218 may, in another embodiment, be included as part of the protected storage medium. It is the drivers that provide the interfaces between the Pre-OS applications and the protected storage, and between the OS-Present applications and the protected storage. In one embodiment, the drivers include a Pre-OS driver and an OS-Present driver to provide interfaces that enable applications to access the protected storage.

Disk memory 224, modem 230 and graphics controller 232 may be coupled to processor 210 via bus 222. Disk memory 224 may be a hard disk drive, a readable and writeable compact disk (CDRW) drive, a floppy disk drive, a stick or card memory device, a digital audio tape (DAT) reader, etc., or any storage device or other machine readable medium local to the processor, as well as connected by a network or any method of communication, including, for example, wireless. In various embodiments, disk memory 224 may be any device by which a machine may read from a machine readable medium known to those skilled in the art, including all forms of optical and magnetic disks, tapes and similar media; ROM, RAM, and similar memory devices; etc. Processor 210 may display images on display 234 via graphics controller 232. All of the components within computing device 200 are well known and will not be discussed in detail so as not to obscure the subject matter of the present invention.

Protected storage 220 may be any non-volatile readable and writeable memory device, such as, for example, magnetic storage media including hard disks, optical storage media including CDRW, flash memory devices, stick memory devices, and the like. In one embodiment, the protected storage is permanent to the computing device and may not be easily removed. The level of protection shared or accessible from the protected storage is determined by the underlying protected storage technology. The underlying storage technology determines the protection mechanism, protocol, and other security requirements which can be known a priori by both Pre-OS and OS-Present applications or, in another embodiment, negotiated during a handshake process. In one embodiment, the negotiations may occur during installation or set up of a particular application program.

Figure 3:
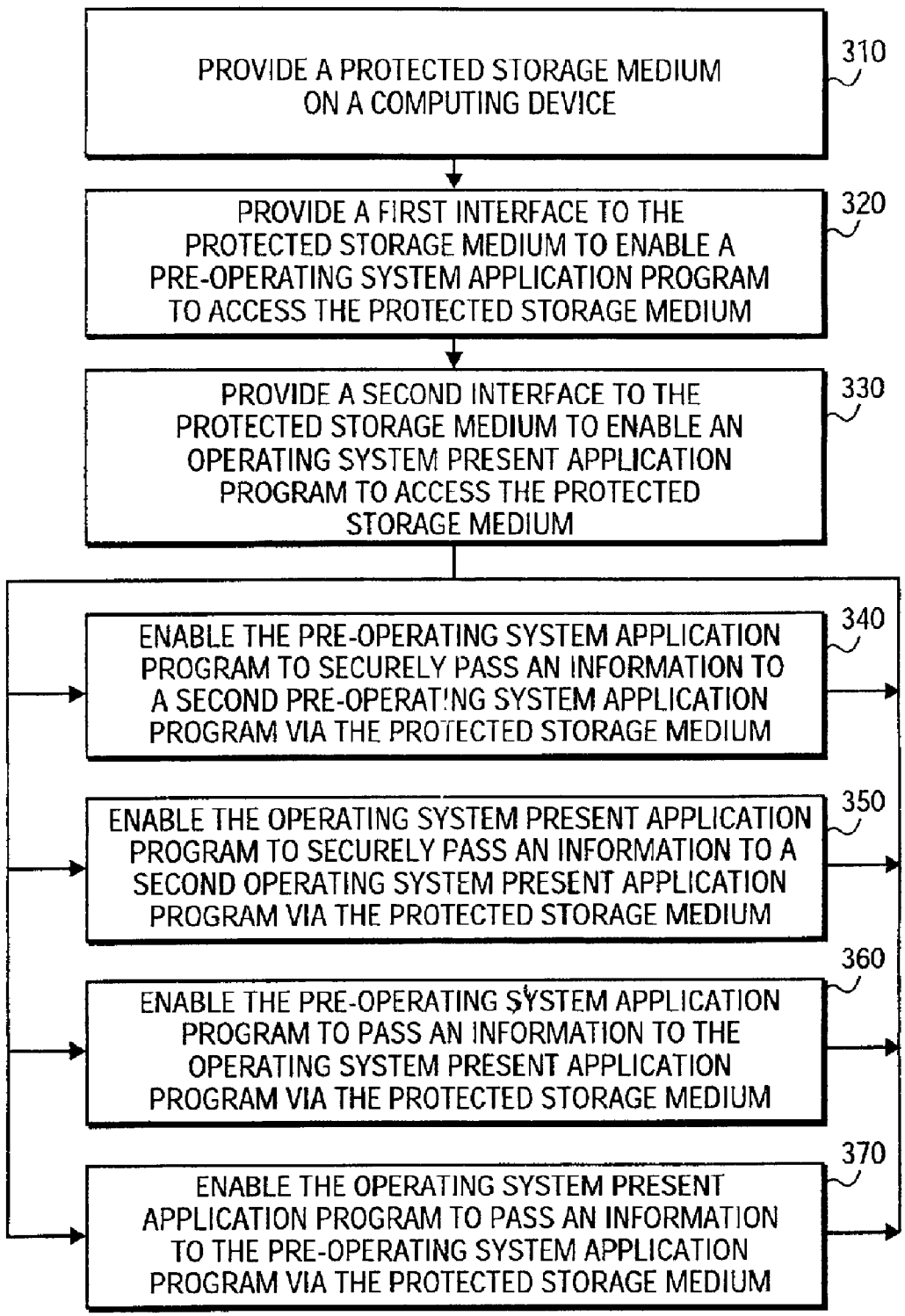
FIG. 3 illustrates a flow of actions taken according to an embodiment of a system and method for protecting messaging.

FIG. 3 illustrates a flow of actions taken according to an embodiment of a system and method for protecting messaging. On a particular computing device a method of the present invention may include providing a protected storage medium, as shown in block 310. To make the storage medium usable, the method includes providing a first interface to the protected storage medium to enable a Pre-OS software program access to the protected storage medium, as shown in block 320. Similarly, a second interface to the protected storage medium is provided to enable an OS-Present software program access to the protected storage medium, as shown in block 330. By virtue of providing these interfaces, the Pre-OS software program is enabled to securely pass an information to a second Pre-OS software program via the protected storage medium, as shown in block 340. Similarly, the OS-Present software program is enabled to securely pass an information to a second OS-Present software program via the protected storage medium. Further, the method enables the Pre-OS software program to securely pass an information to the OS-Present software program via the protected storage medium, as shown in block 360. In addition, the OS-Present software program is enabled to securely pass an information to the Pre-OS software program, as shown in block 370. Although only one Pre-OS application program and one OS-Present application program are discussed regarding FIG. 3, it is contemplated that multiple Pre-OS application programs and OS-Present application programs may use the protected storage for secure message passing among themselves, as shown in FIG. 1, and as discussed below.

In one embodiment, the computing device may have a certain policy which determines what is required for boot or logon to continue. In some embodiments, there may be single factors such as a single password, or, in other embodiments, there may be multiple factors such as two or more of a password, a retinal scan, a fingerprint scan, a voice print identification, location of logon such as an Internet Protocol (I.P.) address, a smart card scan, etc. The Pre-OS applications on a particular computing device may have weaker or less numerous requirements than OS-Present applications, and some OS-Present applications may have more stringent requirements than others. Protected storage may be used to store information about both how the identity of a user was determined and how the user was authorized so that particular applications or the operating system may make a determination if one or more additional authentication measures are required or if access should be denied. In this context, a user may be a human user of a computing device or may be an application program. By allowing Pre-OS and OS-Present application programs to pass information such as authentication information among themselves via the protected storage, a user's computing experience may be made more rewarding.

For example, a Pre-OS application such as a BIOS program may require that the user type in a password as authentication information. The BIOS may then store this information in the protected storage. A later executing Pre-OS application program may access this password information or a message from the BIOS that the user was authenticated by receipt of a password. Based on receipt of this authentication information, the later executing Pre-OS application program may choose not to request a typed in password. The same may apply for OS-Present application programs. Another Pre-OS application or an OS-Present application may obtain further authentication information from a user and either store the authentication information in the protected storage or store an information specifically directed to another OS-Present application. The information passed may be the specific authentication information or may be a notice stating whether the authentication was successful. In this way, later executing Pre-OS and OS-Present applications will not need to re-authenticate the user. In this way, later executing Pre-OS and OS-Present applications may use earlier obtained authentication information from the protected storage to either alleviate the need to further authenticate or reduce the extent of later authentication measures. For example after receiving a password, a later application may not seek a password from the user and may only request the sliding of a smart card or the presentation of a biometric means of authentication such as voice print, retinal scan and fingerprint scan.

This same communication mechanism may be used to send messages in the other direction as well, that is, from the OS-Present space to the Pre-OS space. Passing messages from the OS-Present space to the Pre-OS space may be useful when an OS-Present application wants the Pre-OS application to do something on its behalf, but would not want the action to occur while the operating system was present due to security or other considerations. In this embodiment, when a computing device boots, or rather, restarts or reboots, it may check an assigned or designated protected messaging area of the non-volatile protected storage for messages. In one embodiment, a particular Pre-OS application may be the only software allowed access to a designated protected messaging area. In one embodiment, the protected storage may include a plurality of cells or slots. In this embodiment, a set of cells or slots may be designated solely for access by particular applications. In this embodiment, the kind of allowed access may vary for each area of protected storage, and may include, read, write, read once, write once, etc. In one embodiment, the information may be designated as read once, auto-erase, so that the data retrieved is then immediately erased from the protected storage. This adds another dimension of security to the protected storage. The Pre-OS application may check that the message placed by an OS-Present application into the protected storage and retrieved by the Pre-OS application was authentic, unaltered, and subsequently "trusted." Based on the information retrieved, the Pre-OS application may take any requested or appropriate actions.

The kind of information written to and retrieved from the protected storage will vary based on the purpose and use of the information, and the writer and recipient of the information. The type of information that needs to go into the special protected storage "cell/slot" is determined by the applications that will consume it. But there will be common pieces of information that may be required. Information that may be stored in the protected storage or may be made available by the protected storage include, for example: a requested action data specifying what action is being requested; an identity data identifying the user or application program that is requesting an action; an identity credential data which may attest to the identity of the user or application program; a policy data reporting the policy from the requestor's perspective; a policy credential data that validates the requestor's policy; a completed action data stating what action(s) has/have been accomplished; a miscellaneous-opaque data that may be use specific and may allow for extensibility and customization; and an integrity data that may be used to ensure that a message has not been altered. In addition, various other kinds and forms of data may be accessed via the protected storage depending on the use and purpose of the data and the purpose and goal of the particular application program.

By adding protected storage to a personal computing device with Pre-OS and OS-Present application programs may access protected storage, messages may be sent from one operation space to the other. This can be very powerful as explicit security can be built into these communications that ultimately develop more trust in who is making requests and actions that are being done by proxy. In one embodiment, if a protected storage implementation does not provide sufficient protection to ensure that only authorized entities can access a given storage location, additional fields may be added for use of digital signature or encryption techniques. In this embodiment, the entire contents of a given storage location, such as a set of cells or slots, may be "wrapped" with a digital signature, encryption or both. Any well known digital signature or encryption techniques may be employed.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computing device comprising:
   a host processor coupled to a bus to execute a pre-operating system software program and an operating system present software program;
   a non-volatile memory coupled to the host processor, the non-volatile memory to store the pre-operating system software program;
   a disk memory coupled to the bus, the disk memory to store the operating system present software program and an operating system; and
   a protected storage medium coupled to the host processor, the protected storage medium to enable secure exchange of a protected message between the pre-operating system software program and the operating system present software program via the protected storage medium.

2. The computing device of claim 1 further comprising:
   a first interface to provide the pre-operating system software program access to the protected storage medium; and
   a second interface to provide the operating system present software program access to the protected storage medium.

3. The computing device of claim 1 wherein the protected storage medium is a non-volatile re-writeable memory device.

4. The computing device of claim 1 wherein the protected message is exchanged during boot-up of the computing device.

5. The computing device of claim 1 wherein the protected message includes user authentication information.

6. The computing device of claim 1 wherein the protected storage medium is further configured to enable the operating system present software program to securely store the protected message for the pre-operating system software program subsequent to boot-up of the computing device.

7. The computing device of claim 6 wherein the protected message is retrieved by the pre-operating system software program during reboot of the computing device.

8. A method comprising:
   accessing, by a host processor executed pre-operating system software program, a protected storage medium;
   performing, by the pre-operating system software program a boot-up procedure according to a protected message stored within the protected, storage medium by an operating system present software program; and
   storing, by the pre-operating system software program, boot-up information within the protected storage medium for the operating system present software program according to the protected message.

9. The method of claim 8 wherein the storing comprises:
   formatting user authentication information obtained during the boot-up procedure according to the protected message; and
   securely storing the formatted user authentication information within the protected storage medium.

10. The method of claim 8 wherein accessing comprises:
    detecting the protected message within protected storage medium;
    performing, by the pre-operating system software program, an authentication procedure of the protected message from the protected storage medium; and
    discarding the protected message if the authentication procedure fails.

11. The method of claim 8 wherein the storing the boot-up information comprises:
    encrypting the boot-up information; and
    wrapping the encrypted boot-up information within a digital signature of the preoperating system program.

12. The method of claim 8 further comprising:
    enabling the operating system present software program to perform secure storage of a protected request for the pre-operating system software program subsequent to boot-up of the computing device.

13. The method of claim 12 wherein enabling comprises:

enabling the pre-operating system software program to perform secure retrieval of the protected request from the protected storage medium.

14. The method of claim 13 wherein the protected request is retrieved by the pre-operating system software program during reboot of the computing device.

15. The method of claim 8 further comprising:

accessing, by an operating system present user authentication software program, user authentication information from the protected storage; and authenticating, by the operating system present user authentication software program, a user according to the user authentication information.

16. The method of claim 8, wherein performing further comprises:

requesting, by a pre-operating system user authentication software program, user authentication information according to the protected message;

accessing user verification information from the protected storage;

authenticating, by the pre-operating system user authentication software program, a user according to the user authentication information and the user verification information; and disabling boot-up of a computing device if the user authentication is unsuccessful.

17. A machine readable medium having instructions stored thereon which when executed by a processor cause the processor to perform operations comprising:

accessing, by a host processor executed pre-operating system software program, a protected storage medium;

performing, by the pre-operating system software program, a boot-up procedure according to a protected message stored within the protected, storage medium by an operating system present software program; and storing, by the pre-operating system software program, boot-up information within the protected storage medium for the operating system present software program according to the protected message.

18. The machine readable medium of claim 17 wherein the accessing the protected storage medium causes the processor to perform further operations comprising:

detecting the protected message within protected storage medium;

performing, by the pre-operating system software program, an authentication procedure of the protected message from the protected storage medium; and discarding the protected message if the authentication procedure fails.

19. The machine readable medium of claim 17 wherein the instructions cause the processor to perform further operations comprising:

enabling the operating system present software program to perform secure storage of a protected request for the pre-operating system software program subsequent to boot-up of the device.

20. The machine readable medium of claim 17 wherein the instructions cause the processor to perform further operations comprising:

enabling the pre-operating system software program to perform secure retrieval of the information from the protected storage medium during reboot of the computing device.

21. The machine readable medium of claim 17 wherein the instructions cause the processor to perform further operations comprising:

accessing, by an operating system present user authentication software program, user authentication information from the protected storage; and authenticating, by the operating system present user authentication software program, a user according to the user authentication information.

22. The machine readable medium of claim 17, wherein performing causes the processor to perform further operations comprising:

requesting, by a pre-operating system user authentication software program, user authentication information according to the protected message;

accessing user verification information from the protected storage;

authenticating, by an operating system present user authentication software program, a user according to the user authentication information and the user verification information; and disabling boot-up of a computing device if the user authentication is unsuccessful.

23. The machine readable medium of claim 17, wherein storing causes the processor to perform further operations, comprising:

formatting user authentication information obtained during the boot-up procedure according to the protected message; and securely storing the formatted user authentication information within the protected storage medium.

24. The machine readable medium of claim 17, wherein storing causes the processor to perform further operations, comprising:

encrypting the boot-up information; and wrapping the encrypted boot-up information within a digital signature of the pre-operating system program.

* * * * *

UNITED STATES PATENT AND TRADEMARK OFFICE
CERTIFICATE OF CORRECTION

PATENT NO.       : 6,976,172 B2
APPLICATION NO. : 09/752882
DATED            : December 13, 2005
INVENTOR(S)      : Girard It is certified that error appears in the above-identified patent and that said Letters Patent is hereby corrected as shown below:

In column 6, at line 64, delete "preoperating" and insert --pre-operating--.
In column 2, at line 37, delete "(EPAA)" and insert --(IPAA)--.

Signed and Sealed this

Twenty-third Day of January, 2007

JON W. DUDAS
*Director of the United States Patent and Trademark Office*